United States Patent
Gilman

[15] 3,679,343
[45] July 25, 1972

[54] EXTRUSION MILL WITH ROLLER ADJUSTMENT MEANS

[72] Inventor: Robert W. Gilman, San Francisco, Calif.

[73] Assignee: California Pellet Mill Company, San Francisco, Calif.

[22] Filed: May 4, 1970

[21] Appl. No.: 46,577

Related U.S. Application Data

[62] Division of Ser. No. 652,539, July 11, 1967, Pat. No. 3,559,238.

[52] U.S. Cl............................425/331, 74/571, 425/314, 425/377, 425/382
[51] Int. Cl. .........................................................B29f 3/012
[58] Field of Search ....................18/12 RR, 12 A; 25/30 RR; 259/DIG. 4; 74/571 R

[56] References Cited

UNITED STATES PATENTS

| | | | |
|---|---|---|---|
| 2,067,399 | 1/1937 | Hughes | 74/571 R |
| 2,700,940 | 2/1955 | Johnson | 18/12 RR UX |
| 3,382,818 | 5/1968 | Landers | 18/12 RR X |

Primary Examiner—Robert D. Baldwin
Attorney—Bruce & McCoy

[57] ABSTRACT

An apparatus for adjusting rollers of an extrusion mill comprising an adjustable link extending between a drive post in the roller assembly and a radial extension arm secured to the roller journal shaft which has a journal center eccentric of its roll center.

4 Claims, 4 Drawing Figures

PATENTED JUL 25 1972

EXTRUSION MILL WITH ROLLER ADJUSTMENT MEANS

This is a division Ser. No. 652,539 filing date July 11, 1967 now of U.S. Pat. No. 3,559,238 issued Feb. 2, 1971.

BACKGROUND OF THE INVENTION

The present invention pertains to improvements in radially perforated die pullet mills and more particularly to the extrusion assembly of a walking die pellet mill having a novel means for adjusting the extrusion rollers thereof.

Pellet mills of the type to which the present invention pertains are well known. An example of such is the EXTRUSION MILL of U. S. Pat. No. 2,240,660 to E. T. MEAKIN, issued May 6, 1941. More closely related to the present invention is the EXTRUDING APPARATUS of U. S. Pat. No. 2,295,743 to E. T. MEAKIN, issued Sept. 15, 1942.

It is a problem in pellet mills to keep the extrusion rollers accurately tracking and securely held in position on the internal or working surface of the die. In most extrusion mills having a radially perforated die, and not just mills with a horizontal die, the raw food or extrusion material is generally unevenly distributed across the working surface with a continuous loading of one edge. This produces a tendency for the extrusion roller to "wander" across the working surface of the die away from the packed edge and work loose. Applicant provides a secure means for retaining the extrusion rollers in position to prevent this.

SUMMARY OF THE INVENTION

The present invention is an extrusion mill having a frame supporting an annular die, a main drive shaft supported for rotation by the frame concentric to the die, roller assembly supported by the main drive shaft including at least one fixed main shaft drive post secured to the shaft, at least one roller shaft journalled in the drive shaft parallel to the main shaft drive post, and an extruder roller journalled on the roller shaft. An eccentric relationship is provided between the journal center and the roll center of the roller journal shaft, and a radial extension arm is secured to the roller shaft. A turnbuckle means extends between the main shaft drive post and the extension arm whereby as the length of the turnbuckle is changed, the roller shaft is rotated within its journal in the drive shaft to vary the position of the roll center of the roller journal shaft with respect to the die.

It is an object of the present invention to provide a roller adjustment means for adjusting the relation of the extrusion roller with respect to the working surface of the die which is infinitely adjustable within its range of adjustment.

And a further object of the present invention is to provide an improved extrusion assembly for an extrusion mill employing a horizontal radially perforated extrusion die.

DESCRIPTION OF THE PREFERRED EMBODIMENTS

Figure 1:
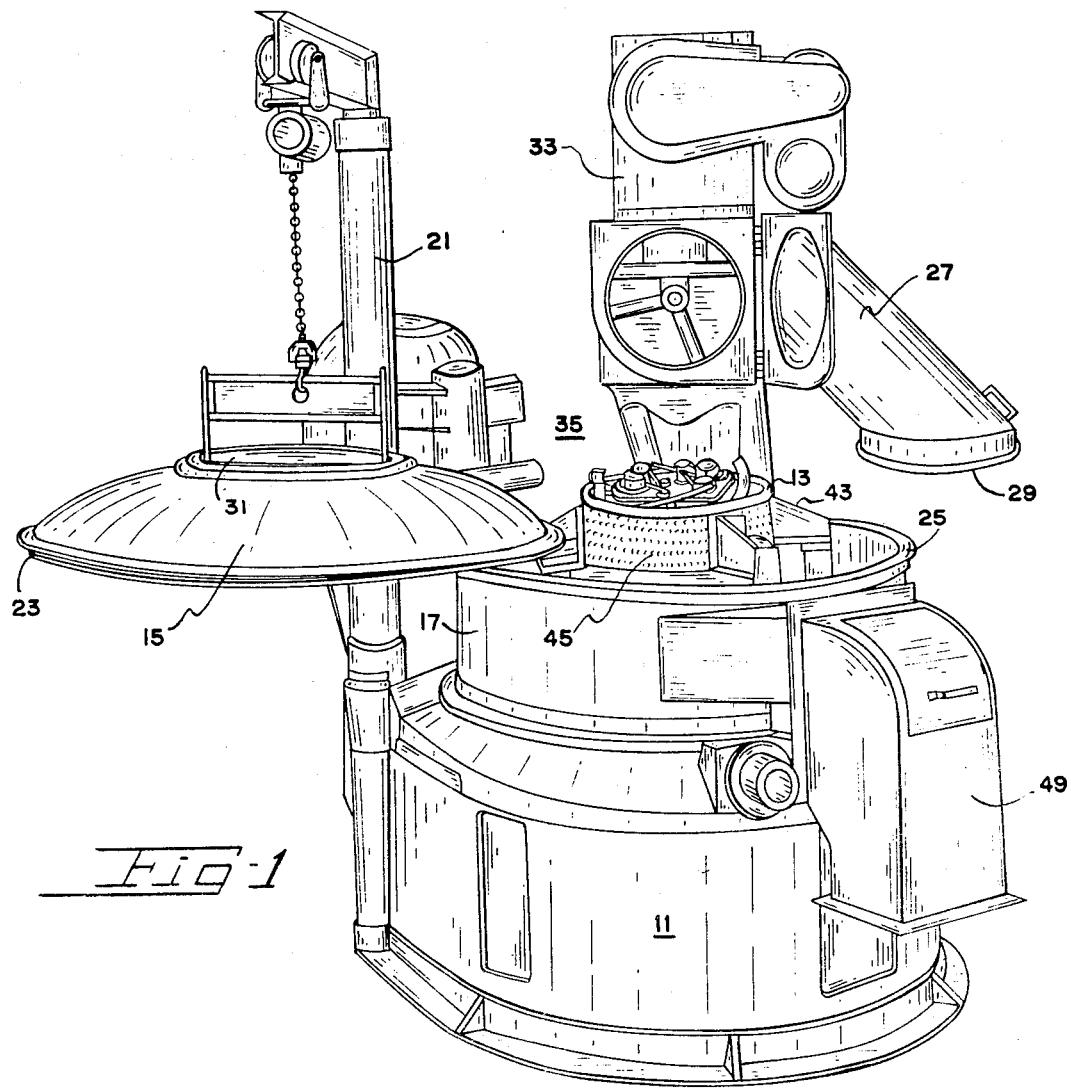
FIG. 1 is a perspective view of the walking die pellet mill of the present invention.
Figures 2, 3:
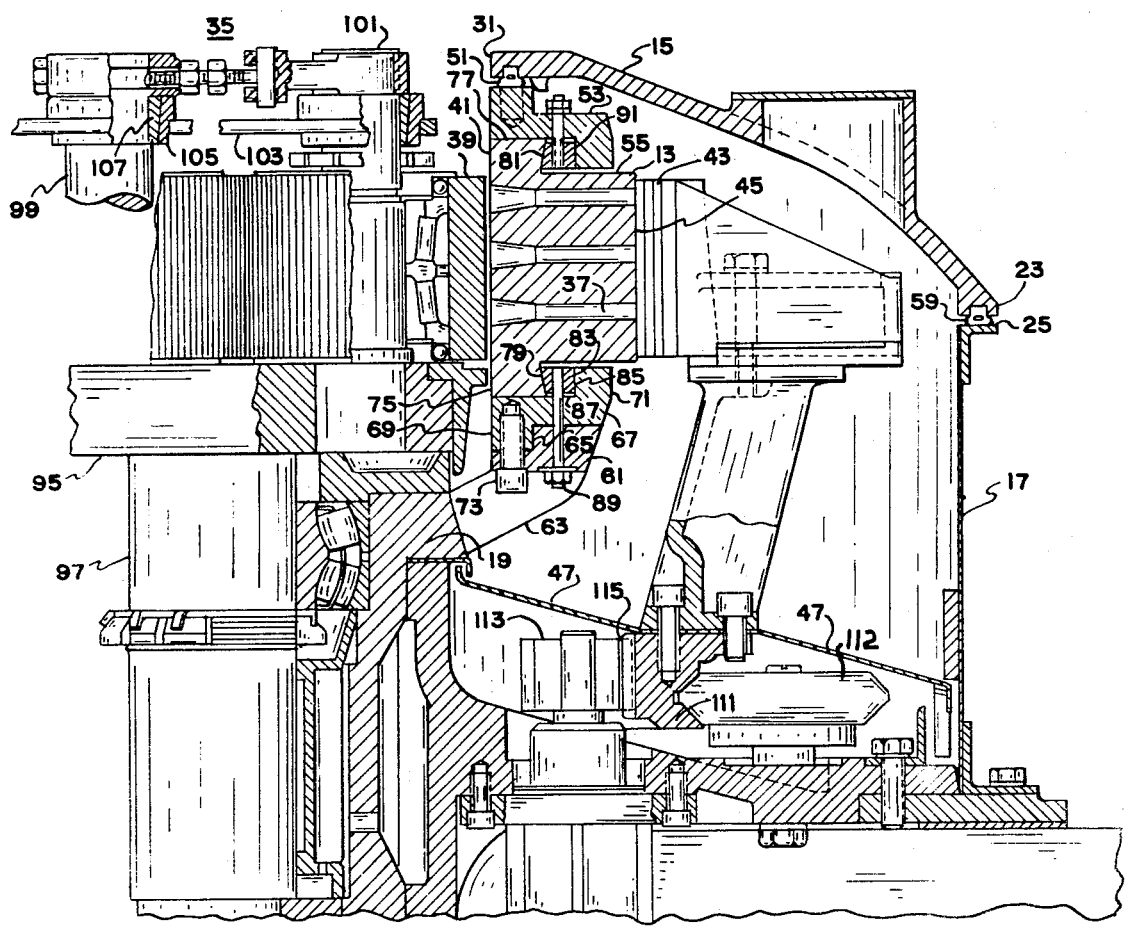
FIG. 2 is a cross-sectional side elevation of a portion of the internal structure of the extrusion mill of the present invention taken along line 2—2 of FIG. 3 and disclosing the extrusion assembly.
FIG. 3 is a plan view of a portion of the extrusion mill of the present invention showing the die and the elements internal thereto.

Reference is first made concurrently to FIGS. 1 and 2 for a general description of an extrusion mill of the type to which the present invention relates and for a description of the preferred embodiments of the present invention. There shown in perspective and cross section is an extrusion mill 11 which employs a radially perforated, horizontally disposed, extrusion die 13. The cover 15 is shown removed in FIG. 1. An outer housing 17 is mounted on the frame 19 of the extrusion mill to keep all of the extrusion and product material in the machine.

To ready the machine for operation, the cover supported by the jib crane 21 is swung into place by the operator. The lower outer edge 23 of the cover mates with the upper peripheral seating face 25 of the housing. The extrusion material feed chute 27 is then swung into place where its lower annular opening 29 is disposed concentrically on the upper inlet opening 31 of the cover.

In operation, the extrusion material is discharged from primary processer 33 atop the mill and spills down the chute 27 to enter the machine through the opening 31 in the cover. An extrusion assembly 35 is disposed internally of the horizontal annular die 13 and effects the extrusion of the material radially outward through the die holes 37 by means of extrusion rollers 39 which rotate around the inner annular working surface 41 of the die 13. As the extruded material is discharged outward from the die, it is cut off by rotating knives 43 which are driven around the outer peripheral surface 45 of the die. As the extruded material is cut off, it drops into the upper portion of the mill housing and onto a rotating sloped apron 47. The apron contrifugally throws the pellets to the outer housing wall 17 and they are swept into a collecting chute 49 at one side of the machine.

The cover 15 is held in operating position simply by its mass. Locating means, such as male and female members on respective portions of the die securing ring and the cover, can be used to locate the cover concentric with the die.

Internally of the cover, and disposed around the edge of the inlet opening 31, is a seal or gasket 51 which fits on a reinforcing ring 53 secured to the top edge 55 of the die. The lower outer edge 23 of the cover likewise has a seal 59 which fits on the upper edge 25 of the housing.

The frame of the extrusion mill forms a horizontal stationary support ring 61 for the extrusion die. The support ring projects outward from the frame 19 by means of a number of radial support arms 63.

An important feature of the present invention is the die securing means which secures the die 13 to the support ring 61. An annular recess 65 is formed in the inner edge of the support ring. A unitary reinforcing ring 67 is provided which has a projecting inner annular or lower flange 69 which fits within the annular recess 65 of the support ring. The reinforcing ring also has an oppositely projecting or upper annular flange 71 which is disposed around its opposite outer edge. The unitary reinforcing ring is secured to the support ring by means of bolts 73 which project through the support ring and engage the lower annular flange 69 of the reinforcing ring. The reinforcing ring is made of hardened steel and is accurately machined.

The radially perforated annular die 13 is disposed concentrically on the support and reinforcing rings and has mirror image first, or lower, and second, or upper, annular trapezoidal flanges 75, 77 respectively. The flanges are characterized by undercut or re-entrant outer peripheral faces 79, 81.

A segmental wedge ring 83 is provided and has a cross section complementary to the first trapezoidal flange 75 of the die. It is necessary that the wedge ring be made in segments in order to fit around the re-entrant peripheral face of the die. However, it could be simply split at one point and stretched to fit around the die. In this respect, the context of the term segmental ring is meant to include a ring which is simply split at one point as well as a ring split into two or more pieces.

When the wedge ring is placed in operating position, it has its outer peripheral face 85 abutting the inner peripheral face 87 on the outer or upper flange 71 of the reinforcing ring 67. The wedge ring engages the lower trapezoidal flange 75 of the die in captured relation whereby as the wedge ring is drawn toward the reinforcing ring, the die is forced to seat against the reinforcing ring. In the preferred embodiment, the wedge ring is tightened by studs 89 which project through the support ring and the reinforcing ring to engage the segmental wedge ring 83. Other clamping means than those here shown could be used.

An upper reinforcing ring 53 and a wedge ring 91 are secured to the upper flange 77 of the die and form a sealing surface for the cover of the mill. More importantly they strengthen the die, but they are unnecessary to the proper functioning of the invention. In fact, the upper trapezoidal flange is unnecessary, but it has the important advantage of making the die reversible.

A roller type extrusion assembly 93 is supported on a radial flange 95 of the main drive shaft 97. The roller assembly includes at least one main shaft drive post 99 which is secured to the drive shaft. In the preferred embodiment, a press fit is used to secure the drive post to the flange to prevent its working loose during operation. At least one roller journal shaft 101 is journalled at its lower end in the flange 95 of the main drive shaft and supports an extrusion roller 39 journalled thereon. Both the drive post and the journal shaft are arranged parallel the axis of rotation of the main drive shaft.

In practice, these elements, the main shaft drive post 99 and the roller journal shaft 101, are usually provided in pairs or a symmetrical threesome to balance the extrusion forces on the internal surface of the die.

Figure 4:
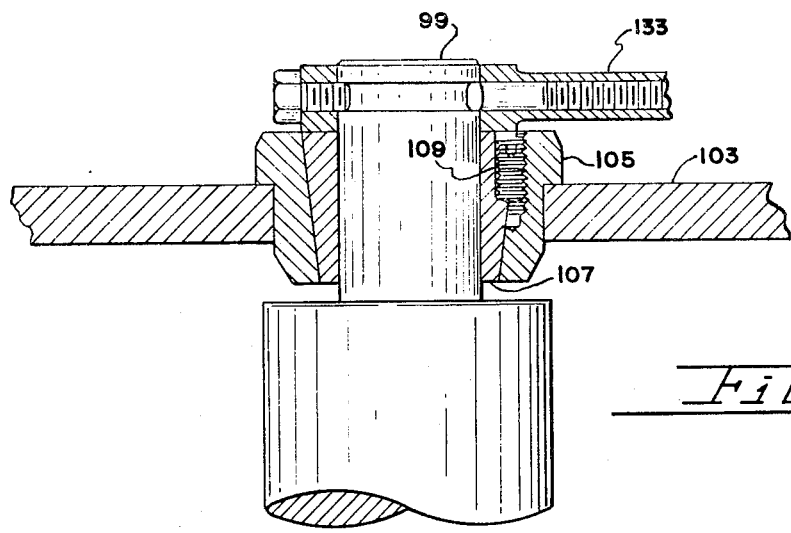
FIG. 4 is a partial sectional view in side elevation of the top end of a main shaft drive post and drive plate of the roller assembly.

Reference to FIGS. 2, 3, and 4 will aid in understanding the arrangement of the extrusion assembly 35 of the present invention. There shown are a pair of main shaft drive posts 99 disposed opposite each other and a pair of roller journal shafts 101 also disposed opposite each other. In the preferred embodiment, these posts and shafts are disposed on symmetrical axes with respect to the drive shaft and the corresponding posts or shafts are disposed equidistant on those axes from the drive shaft. The extrusion rollers 39 are journalled on the roller journal shafts and operate by rotating around the internal surface 41 of the extrusion die.

Also included as a particular feature of the present invention is the extrusion roller retaining means which comprises a drive plate 103 secured to both the main shaft drive posts 99 and the roller journal shafts 101. This element is most clearly illustrated in FIGS. 2 and 4. The drive plate is secured to the upper ends of the drive posts and the roller journal shafts by means of a device which is known in the trade as a "Taper Lock" (the registered trademark of the manufacturer of the device). The outer sleeves 105 thereof are secured to the drive plate while the inner sleeves 107, which are of a split ring configuration, are wedged into engagement with the posts and shafts when the outer sleeves are drawn tight on the inner sleeves by means of inserted set screws 109.

The drive plate is secured to the posts and shafts on the opposite side of the roller 39 from the drive shaft flange whereby the roller is captured between the flange and the plate. The drive plate also provides the function of supporting the upper end of the journal shafts in position with respect to their journals in the drive shaft flange. More importantly, the drive plate securely holds the rollers in place whereby they track accurately around the internal surface of the extrusion die and cannot work off the roller shafts.

The rotating knives 43 which sever the projecting extruded material into pellets are supported by a turntable 111 mounted on rollers 112. The speed of the knives can be varied to control pellet length. The turntable is driven by means of a pinion gear 113 which meshes with a ring gear 115 provided internally on the turntable.

It is a further characteristic of the present invention that it is provided with a novel roller adjustment means which utilizes an eccentric relation between the journal center and the roll center of the roller journal shaft controlled by a rigid turnbuckle assembly. As the roll journal shaft is rotated within its journal by the turnbuckle, the center of rotation of the extrusion roller is changed and describes a circular path. Thus, as the roller journal shaft is turned, the extrusion roller can be moved toward or away from the working surface or the inner annular face of the extrusion die.

Referring to FIGS. 3 and 4, radial extension arms 129 are secured to the roller shafts 101 by splines 131 which run parallel the axis of the roller shafts. Turnbuckle means 133 extend between the main shaft drive posts 99 and the extension arms. The turnbuckle means engage with the radial extension arms in such a manner that as the turnbuckle means are lengthened or shortened the radial extension arms turn or rotate the roller journal shaft 101. The changing of the length of the turnbuckle means varies the position of the roll center of the roller journal shafts with respect to the die and thus permits adjustments of the position of the extrusion roller with respect to the die. The turnbuckle means 133 is secured to the drive posts by means of set screws which further prevent the plate 103 from lifting off the posts.

The adjustment length of the turnbuckle means is at least, and in preferably slightly more than, equal to the angular rotation of shifting the extension arm on the roller shaft one set of splines 131. Thus, if rotracting the turnbuckle means its full length does not produce satisfactory adjustment, the turnbuckle means can be extended to its initial length and the extension arm lifted off the roller journal shaft and rotated with respect to the roller journal shaft one set of splines. Then a new range of adjustment is available which starts at the point the last range of adjustment ended. In other words, when the extension arm is lifted off and indexed one notch, another full run of adjustment through the turnbuckle is available to effect proper adjustment of the roller with respect to the die.

Due to the use of a turnbuckle for the adjustment means, the roller adjustment means is infinitely adjustable along its range of adjustment which in turn is governed by the length of the offset between the roll center and the journal center of the roller journal shaft. Improved roller adjustment means permits an infinitely accurate adjustment of the rollers with respect to the die.

It will be apparent from the foregoing description of the invention, in its preferred form, that it will fulfill all the objects attributable thereto. While it has been illustrated and described in considerable detail, the invention is not to be limited to such details as have been set forth except as may be necessitated by the appended claims.

I claim:

1. In an extrusion mill having a frame supporting an annular die, a main drive shaft supported for rotation by said frame concentric to said die, a roller assembly supported by said main drive shaft including at least one fixed main shaft drive post secured to said shaft, at least one roller journal shaft journalled in said drive shaft parallel said main shaft drive post, and an extrusion roller journalled on said roller shaft, an improved extrusion roller adjustment means comprising
   an eccentric relation between the journal center and the roll center of said roller journal shaft,
   a radial extension arm secured to said roller shaft, and
   turnbuckle means extending between said main shaft drive post and said extension arm whereby as the length of said turnbuckle is changed said roller shaft is rotated within its journal in said drive shaft to vary the position of the roll center of said roller journal shaft with respect to said die.

2. The extrusion mill of claim 1 wherein a roller adjustment means is provided for each roller in said roller assembly.

3. The extrusion mill of claim 1 wherein said radial extension arm is secured to said journal shaft by splines and the adjustment length of said turnbuckle means is at least equal to the angular rotation of shifting said radial extension arm on said roller shaft one set of splines.

4. In an extrusion mill having a frame supporting an annular die, a main drive shaft supported for rotation by said frame concentric to said die, a roller assembly supported by said main drive shaft including at least one fixed main shaft drive post secured to said shaft, at least one roller journal shaft journalled in said drive shaft parallel said main shaft drive post, and an extrusion roller journalled on said roller shaft, an improved extrusion roller adjustment means comprising
   an eccentric relation between the journal center and the roll center of said roller journal shaft, a radial extension arm secured to said roller shaft by splines, and turnbuckle means extending between main shaft drive post and said extension arm whereby as the length of said turnbuckle means is changed said roller shaft is rotated within its journal in said drive shaft to vary the position of the roll center of said roller journal shaft with respect to said die, the adjustment length of said turnbuckle means being at least equal to the angular rotation of shifting said extension arm on said roller shaft one set of splines.

* * * * *